US008320245B2

(12) United States Patent
Lange (10) Patent No.: US 8,320,245 B2
(45) Date of Patent: *Nov. 27, 2012

(54) POLICY ENFORCEMENT POINTS (75) Inventor: Andrew S. Lange, Culver City, CA (US)

(73) Assignee: Alcatel Lucent, Paris (FR)

( * ) Notice: Subject to any disclaimer, the term of this patent is extended or adjusted under 35 U.S.C. 154(b) by 573 days.

This patent is subject to a terminal disclaimer.

(21) Appl. No.: 11/717,880

(22) Filed: Mar. 13, 2007

(65) Prior Publication Data

US 2008/0225712 A1  Sep. 18, 2008

(51) Int. Cl.
G01R 31/08 (2006.01)
H04L 12/28 (2006.01)
H04B 7/212 (2006.01)
(52) U.S. Cl. ............... 370/230; 370/395.21; 370/395.42; 370/444
(58) Field of Classification Search .................. None
See application file for complete search history.

(56) References Cited

U.S. PATENT DOCUMENTS

| 6,269,078 | B1 * | 7/2001 | Lakshman et al. | 370/230 |
|---|---|---|---|---|
| 6,522,636 | B1 * | 2/2003 | Hogberg et al. | 370/316 |
| 7,016,375 | B1 * | 3/2006 | Rosenberg et al. | 370/468 |
| 7,643,467 | B2 * | 1/2010 | Smith et al. | 370/351 |
| 2002/0194362 | A1 * | 12/2002 | Rawlins et al. | 709/235 |
| 2003/0074443 | A1 * | 4/2003 | Melaku et al. | 709/224 |
| 2006/0039364 | A1 * | 2/2006 | Wright | 370/352 |
| 2006/0083238 | A1 * | 4/2006 | Lee et al. | 370/389 |
| 2006/0215548 | A1 * | 9/2006 | Le Faucheur et al. | 370/228 |
| 2007/0036078 | A1 * | 2/2007 | Chowdhury et al. | 370/230 |
| 2007/0177503 | A1 * | 8/2007 | Mooney et al. | 370/230 |
| 2007/0189274 | A1 * | 8/2007 | Liu | 370/352 |
| 2008/0225706 | A1 * | 9/2008 | Lange | 370/230 |
| 2008/0225707 | A1 * | 9/2008 | Lange | 370/230 |
| 2008/0225708 | A1 * | 9/2008 | Lange | 370/230 |
| 2008/0225709 | A1 * | 9/2008 | Lange | 370/230 |

* cited by examiner

Primary Examiner — Kwang B Yao
Assistant Examiner — Jutai Kao
(74) Attorney, Agent, or Firm — Wolff & Samson PC (57) ABSTRACT A policy enforcement point (PEP) attaches to the edge of a network to manage loading when the network nears or exceeds its capacity due to changes in the network, e.g., component failures or incremental growth. Autonomous PEP's at the network's edges provide short-term, application-aware controls on their own that are applied to the corresponding network ingress traffic. Path tables are used to calculate whether particular PEP's can admit more traffic, or should they shed sessions/calls to keep service up for the existing application traffic. Long-term controls are periodically downloaded as admission tables from a session/call admission controller to the PEP's.

9 Claims, 6 Drawing Sheets

POLICY ENFORCEMENT POINTS

BACKGROUND OF THE INVENTION

1. Field of the Invention

The present invention relates to providing end-to-end quality of service (QoS) in computer networks, and in particular to policy enforcement points for maintaining end-user satisfaction with voice, video, and data applications at the edges of packet-switched networks.

2. Description of the Prior Art

The challenging applications that telecommunications networks must support now include fixed and mobile voice, broadcast and on-demand video, and data. Each type of application places different demands on the network's resources. Some applications are more sensitive to loss, delay, or jitter, than are the others. But always, the principal quality of service objective is to satisfy the end-user's expectations.

An ideal goal in designing and engineering packet-switched networks is to be able to continue to satisfy the traffic demands of voice, video and data applications in spite of worst-case, single failures under peak load conditions. A network so robust as this has a very high probability of being able to continue to provide all the various applications with all the resources they need to deliver a flawless user experience.

However, such ideal design cannot always be accommodated due to the costs involved and shortages of resources. Growth in demand can develop more quickly than the provisioning can keep up with. Mistakes can be made. Multiple critical network failures can happen at the same time, and cause the network to congest such that information is lost in transmission and the end-user experience is degraded.

Some applications, such as email, can naturally deal with congestion. Congestion with email traffic rarely causes a change in user experience, and its effects are often acceptable. However, voice, video, and other applications are more real-time, and much more sensitive to network delays and congestion. The end-user experience can degrade quickly and affect all users simultaneously.

Packet-switched networks can be designed to prioritize traffic when congestion is threatened. Each application marks its data with a particular traffic class, and each marking is read later to place the traffic in a priority order. When the network starts to congest, the routers forwarding onto congested links can change modes to begin sending only the traffic marked with the highest class first. Then the second highest class traffic is forwarded, and so on, up until the link congests, and the router starts to drop traffic.

In most cases of congestion, such a priority traffic mechanism is enough to ensure that high priority applications get the resources they need. But too much traffic within a class can congest a network anyway.

If losses occur in a data traffic-class, data applications can usually cope with it and gracefully recover. There will be little or no degradation in user experience. But if the losses occur in a voice or video traffic class, voice and video applications are usually not equipped to cope with it. So their service will be degraded across all the users when an application-dependent threshold of degradation is reached. After which, the application effectively becomes unusable. So something more than simple traffic-class prioritization is needed.

Session/Call Admission Control (S/CAC) is a good answer. S/CAC limits the sessions/calls that are admitted into the network to only those that the network can support at a particular quality level. S/CAC will deny some later users any service, in order to prevent everyone else's existing service from degrading. S/CAC guards against multiple failures, or a lack of available resources, to service anticipated peak load under single failure. It prevents losses due to resource congestion from growing from small to large. But S/CAC is not easy to implement in an packet-switched network because the routing topology is ever-changing and a way to enforce bandwidth reservations is needed.

Voice and data have traditionally been supported by two independent networks. Voice transport over IP (VoIP) allows service providers to merge voice and data networks into a single infrastructure. The success of VoIP depends on being able to offer to the end user similar quality of experience. Speech communication quality is subjective, it depends on the users' expectations, the subjective perception of the call, overall quality, volume, intelligibility, speaker identification and naturalness, and physical factors such as loss, echo, delay and noise.

Video on demand (VOD) is almost as demanding as voice in many ways. The bandwidth required can be much greater, especially for high definition (HD) video.

VoIP and Video QoS is affected by delay and jitter (variation in delay). The packet network, terminals, and gateways can all delay the communication. If these delays are inconsistent they can add to jitter. The cumulative effects of these delays limits the achievable quality, delays longer than 400-ms break conversation interactivity.

Network delay in packet networks is due to transmission delay introduced in every link along the path to the destination and queuing delay in every router. Transmission delay depends on sub network technology, while queuing delay depends on queuing policies at the routers. Terminal delay depend on terminal type and processing power. Software-based terminals show higher delay than hardware-based ones. Special equipment such as low rate codec's is necessary to reduce network load, but this will also degrade speech quality by increasing quantizing noise, distortion and delay. The noise sources come from the power sum of electric circuit noise, and room noise. Noise sources at each end of the communication can be easily controlled by proper tuning of the loudness ratings and listener sidetone. The network affects network delay, jitter, and packet loss. But since delay and packet loss in the network are correlated, it can be said that a network with a limited delay will also have negligible packet loss.

IP networks offer an unreliable, connectionless network-layer service that is subject to packet loss, reordering and duplication, all of which, together with queuing delay in router buffers, will increase with network load.

Because of the lack of any firm delivery guarantees, traditional IP delivery is "best-effort". TCP and other higher layer end-to-end protocols are required to add-in end-to-end reliability. Network service degrades as the traffic in the network increases, causing problems for telephony and other real-time applications.

QoS protocols are used where traffic with real-time requirements is distinguished from other traffic classes that can tolerate delay, jitter and loss. Two strategies for QoS provisioning are resource reservation and prioritization. Resource reservation apportions network resources according to an application's QoS request, subject to a bandwidth management policy. In prioritization, network traffic is classified and apportioned amongst network resources according to bandwidth management policy criteria. Network routers give preferential treatment to classifications identified as having more demanding requirements, e.g., individual application flows or flow aggregates.

Flows are individual, uni-directional data streams between applications, e.g., as uniquely identified by transport protocol, source address and port number, and destination address and port number. Two or more flows with something in common are aggregates. Applications, network topology and policy dictate which type of QoS is most appropriate in a given situation.

MPLS provides for bandwidth management for aggregates via network routing control according to labels in (encapsulating) packet headers. MPLS builds paths across an IP network core, and sends packets along predefined paths. When a packet enters the network, an edge router looks up the destination address of the packet and tags it with a label that specifies the route and class of service (CoS) attributes.

One reason multiprotocol label switching (MPLS) was developed was to allow routers to have smaller forwarding tables and, in theory, operate at higher speeds because they would act like simple switches. As labeled packets move across the network, each router uses the labels to choose the destination, and CoS, of the packet. Rather than looking up the destination address for each packet in a routing table, as the packet leaves the core of the network, an edge router uses the destination address in the packet to direct it to its final destination. Subsequent packets in the data stream are quickly and automatically labeled.

Label switching routers (LSR's) build the path that a packet takes across the core of the network, e.g., a label switched path (LSP). Labels stored by each router define the path, which can follow specific routes or constraints. LSRs at the core of the network participate in routing topology exchanges and become true peers with the edge routers. The number of peers each edge router must communicate with is reduced to the immediately adjacent LSRs and routers if certain protocols, such as LDP are used.

Labels can be used to identify traffic that should receive special treatment to meet QoS requirements. By using sophisticated traffic management techniques for the LSP's defined by the LSR's, guaranteed service level agreements can be delivered in an IP network environment. A more complex aspect of MPLS involves the distribution and management of labels among MPLS routers, to ensure they agree on the meaning of various labels. Label Distribution Protocol (LDP) is specifically designed for this purpose, but it is not the only possibility.

Admission controls are not needed in large networks with excess bandwidth. But real-world networks are run much closer to their limits because of construction costs and/or usage growth. What is needed are methods and equipment to provide end-to-end quality of service (QoS) in real networks.

SUMMARY OF THE INVENTION

Briefly, a policy enforcement point attaches to the edge of a packet-switched network to manage loading when the network nears or exceeds its capacity due to changes in the network, e.g., component failures or incremental growth. An advanced bandwidth manager (ABM) comprises a session/call admission controller (S/CAC) that monitors and maps ever-changing network topology information gathered from remote listeners about how traffic is being routed through various parts of the network. These reports are harmonized to build a single view of the network topology, and the point-to-point connections are abstracted into path tables. Autonomous policy enforcement points (PEP's) at the network's edges provide short-term, application-aware controls on their own that are applied to the corresponding network ingress traffic. The S/CAC uses the path tables to calculate whether particular PEP's can admit more traffic, or should they shed sessions/calls to keep service up for the existing application traffic. Long-term controls are periodically downloaded as admission tables from the S/CAC to the PEP's.

An advantage of the present invention is that a network is provided that can deliver acceptable quality for each service at an economical cost to end users.

Another advantage of the present invention is a networking method is provided for good planning and provisioning, so there will be enough fundamental bandwidth available to serve the demand, and provide effective integrated tools.

A further advantage of the present invention is that a network is provided for marking and giving priority treatment to important applications' traffic, so congestion is handled correctly, and priority traffic is sent first.

A still further advantage of the present invention is that a network is provided with bandwidth management of important applications.

A further advantage of the present invention is a network is provided for session or call admission control in the bandwidth management of important applications, so when there is congestion within a traffic class some users are denied service to preserve the quality of experience for the majority of users.

Another advantage of the present invention is a networking method and system are provided that are scalable, stable, flexible, and application-aware such that they take into account network life-cycles to assure the QoS.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
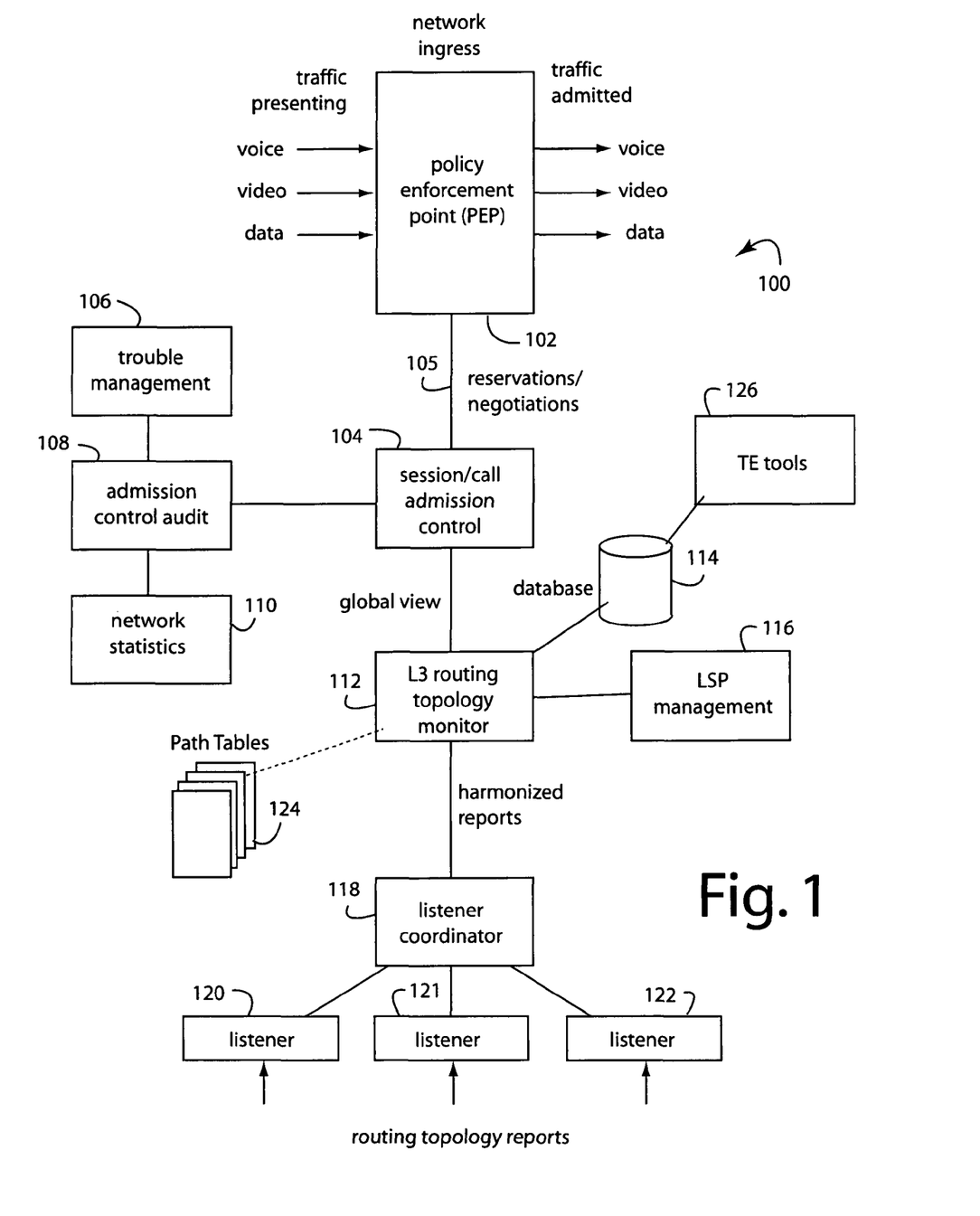
FIG. 1 is a functional block diagram of an advanced bandwidth management assembly embodiment of the present invention that can be attached to a packet-switched network to provide traffic class admission for end-to-end QoS.

FIG. 1 represents an advanced bandwidth manager (ABM) embodiment of the present invention, and is referred to herein by the general reference numeral 100. The bandwidth manager 100 comprises at least one policy enforcement point (PEP) 102, a session/call admission controller (S/CAC) 104, reservations/negotiation traffic 105, a trouble manager 106, an admission control audit function 108, a network statistic function 110, a layer-3 (L3) routing topology monitor 112, a database 114, a label switched path (LSP) manager 116, and a listener coordinator 118 connected to receive point-to-point core-router link reports, e.g., from a plurality of listeners 120-122. The routing topology monitor 112 builds a topology map from comprehensive point-to-point link information from the core-router link reports. It converts the information into abstracted end-to-end path connections listed in a path table 124 for an easy-to-index, single view of the network topology.

Engineering tools can be used to extract greater utilization from existing transport infrastructures. Therefore, an IP-transport network traffic engineering tool 126 is included that mines data collected and deposited in the ABM database 114. It provides empirical information that can be used as a basis to make intelligent network changes and improvements.

In a simple exemplary MPLS network routing topology for a network in the United States, each major city can be represented by a label switching router that can serve as a source, destination, or transit point label switching router for voice, video, and data application traffic. Table I is an end-to-end abstraction tabulation of various paths across the network that can begin in San Francisco (SFO). Reservations according to traffic class can further be allocated, apportioned, and prioritized according to service level agreements. Such example corresponds to a small part of path tables 124 in FIG. 1, and would be used with an admission table locally in the (SFO) PEP 102.

TABLE I

Example Partial Path Table in ABM
for traffic originating at PEP at SFO

| Path |
| --- |
| SFO-SEA |
| SFO-SEA-YVR |
| SFO-LAX |
| SFO-SAC-ABQ-LAX |
| SFO-SAC-SLC-DEN-CHI-NYC-WAS |
| SFO-LAX-ABQ-DFW-ATL-WAS |
| SFO-SEA-YVR-YTO-YMQ-BOS |
| SFO-SAC-SLC-DEN-CHI-BOS |

N.B.
Paths with the same source and destination are assumed to be equal-cost multiple paths, where the load is split. Even splits between ECMP is default, but the ABM supports operator policy to allow uneven splits between ECMP.

Information in Table-I is learned from the L3 routing topology monitor based on information provided by the listener coordinator, and possibly modified by the LSP management function.

TABLE II

Example Partial Reservation Table in
ABM for traffic originating at PEP at SFO

| Source | Destination | Reservation |
| --- | --- | --- |
| SFO | SEA | 10 bwu |
| SFO | YVR | 15 bwu |
| SFO | LAX | 110 bwu |
| SFO | WAS | 50 bwu |
| SFO | BOS | 90 bwu |

The information in Table-II is initially obtained from the operator during provisioning. Such information will be based on historical peak demands information or gravity-model provisioning. Over time, the reservation table can be updated by PEP's admission requests reflecting the traffic growth.

The information from the path table (table I) and the reservation table (table II) are joined together to produce a table of information that contains the amount of reserved bandwidth per-link in the network. By comparing the amount of reserved bandwidth to the amount of available bandwidth on a per-link basis, the ABM can determine if there is a congested reservation on any given link. These tables can also be used to trace back which demands are congesting any given link.

The example tables given here represent only one data structure that could be used to implement the ABM. Other methods and data structures may also be used.

Referring again to FIG. 1, the S/CAC 104 makes long-term decisions on how to best manage network ingress traffic at PEP's 102 on the edges of a packet-switched network, e.g., for the good of the majority of the users and their connections. Or, to maximize revenues when all users and their connections cannot be accommodated. Traffic management becomes necessary when the packet-switched network nears or exceeds its capacity due to failures or traffic growth.

The remote listeners 120-122 are used to learn and monitor the network topology. Each new report corresponds to how traffic is actually being routed through various ever-changing parts of the packet-switched network.

The listener coordinator 118 continually harmonizes incoming routing topology reports in order to build a topology map from comprehensive point-to-point link information for an update-to-date single view of the network topology.

The L3 routing topology monitor 112 builds such single view of the network topology and converts it into abstracted point-to-point connections for a path table 124. The S/CAC uses said path table to calculate whether particular PEP's can admit more traffic, or should shed sessions/calls, and still keep service up for most pre-existing traffic, and wherein long-term controls are periodically downloaded as admission tables from the S/CAC to the PEP's.

PEP's 102 provide short-term, application-aware admission controls on their own that are applied to corresponding network ingress traffic. An internal admission control table is used as a basic management device to determine how much application traffic in each traffic class can be admitted. For example, voice, video, and data application traffic streams can be treated differently and prioritized. If a new call or session is presented to PEP 102, its admission table is consulted to see if enough bandwidth in that class is reserved for it. If so, the PEP 102 itself can admit the call. Otherwise, the S/CAC 104 must be consulted for increased bandwidth reservations.

The listeners 120-122 are placed at various nodes throughout a managed packet-switched network, and will generate interior gateway protocol (IGP) reports to be received by the listener coordinator 118. Typical IGPs used in carrier networks include OSPF and ISIS.

Each host with a router in the network can use the routing table information to determine the next host to route a packet to for a specified destination. With OSPF, a host that obtains a change to a routing table or detects a change in the network can multicast the information to all other hosts in the network so that they all will have the same routing table information.

In operation, during a network failure, an IGP report will come into one or more of the listeners 120-122 that will inform the ABM 100 of the details of the failure. The results are coordinated by listener coordinator 118 to present a single view of the network to L3 topology routing function 112 for calculation. If present, RSVP-TE LSP information is added to the calculation by LSP manager 116. RSVP-TE is a protocol that can be used by a network operator to create fully or partially explicit paths in the network. MPLS labels are signalled with RSVP-TE, and the resulting LSP's are used to create these paths. The primary purpose of these paths is to offer more optimal paths than could be provided by only using the IGP-calculated shortest paths between each source and destination. The secondary purpose of RSVP-TE is to create a "bandwidth reserved" path between two endpoints. This is an attempt to emulate the circuit-switched model present in the old TDM voice networks. Creating bandwidth reservations using RSVP-TE has significant shortcomings. Among them are 1) inefficient use of network resources, 2) non-deterministic failure scenarios, 3) significant scaling problems due to required per-LSP state and the large number of LSP's required.

RSVP-TE makes use of PATH and RESV messages, and other defined objects to signal, establish, and maintain label switched paths. The PATH message is used to signal and request information required to establish the LSP from end-to-end, from ingress to egress. Each RSVP PATH message includes session attributes and the label request object. RSVP-TE provides ordered downstream-on-demand label manageability, so if a downstream router does not have a label binding to FEC to satisfy a request, it propagates the request downstream until an egress router receives the request. Each router that receives a PATH message stores the information in the path state block (psb). The LSP-ID is used as a unique identifier for each LSP. Egress routers will respond to PATH messages with a reservation (RESV) message.

All routers along the path use Call Admission Control (CAC) to make the necessary bandwidth reservations and distribute the label binding to FEC to the upstream router. The label is distributed using the Label Object. Labels sent up stream become the output labels for the routers receiving the label object. The labels that a router issues to an upstream become the inbound label used as the lookup into the hardware output tag table. The reservation specific information is stored in a reservation state block (rsb). Periodically the state of the LSP is refreshed. There is also a hello timer running to ensure that there is connectivity along each LSP. A full-mesh of LSP's, as a minimum, is typically required.

A path table 124 is calculated and represents a full matrix of all the paths in the routed network, and is passed to the session/call admission controller 104. Path table information is stored in the database 114 for analysis of the historical changes in network paths and path loadings. The analysis can be useful in planning and provisioning future updates and modifications to the network.

Each path defines and reserves all the links in a particular routing through the constituent edge and core routers. But straight reservations can congest link capacity, so session/call admission controller 104 invokes a fairness/cleverness algorithm. For example, see Table-I.

TABLE III

| fairness/cleverness algorithm example |
|---|
| A reservation A to B takes a link path, A-R-L-D-B. A change in the network causes link A-R to have 100 fewer units of bandwidth available to it. Formerly it supported 250 units, now it support 150 units. PATH table reveals link A-R is also used by demands AB and AC. Query PEP A for the actual utilization of AB and AC. Example responses, AB 90/100, AC 70/150. Compute needed bandwidth (RESV-CAP = 100). |

TABLE III-continued

| fairness/cleverness algorithm example |
|---|
| Compute free bandwidth (AB = 10, AC = 80). Divide reservation reduction between paths in minimally intrusive way, e.g., needed bw (100) − free bw = total reduction (TRR) (10). TRR (10) / number of demand pairs (2) = TRR per demand (5). BW adjustment = free bandwidth + TRR per demand. Adjust reservations for AB and AC demands (AB 100 -> 85, AC 150 -> 65). This causes only 5 units worth of dropped calls per demand. Push reservations to PEP's 402. |

Short-term network demand growth can often be immediately accommodated because new bandwidth increases are implemented in coarse steps up during each capital expenditure. Such overcapacity helps meet current peak demands. For example, adding a same capacity link yields a two fold increase in bandwidth. Moving the equipment up the SONET/SDH hierarchy provides a four fold step up. Moving up the Ethernet hierarchy provides a ten fold increase. The extra capacity is held by ABM 100 in a pool that can be allocated to PEP's as needed to accommodate their respective growing needs.

The admission control audit function 108 catches traffic class misconfigurations. All traffic in certain classes must be under appropriate admission control, otherwise congestion and degradation of service would occur. The admission control audit function 108 uses link RESV and path tables 124 to do its audits.

The network statistic function 110 periodically collects statistics from the network. Per-class traffic statistics are collected from all intermediate links. Per-class traffic statistics are gathered from all access links. A link reservation matrix from the S/CAC module 104 is used to identify these links. If the utilization exceeds the reservations (UTIL>RESV), then an alarm is sent to get such traffic under admission control. Only links listed in the path table 124 should be passing particular traffic classes into the network. If traffic in a particular traffic class is being injected into the network that should not be, or a node that should be under admission control is not, then an alarm is sent to correct the situation. The links listed in the path table 124 should include all relevant nodes in the network.

Bandwidth manager 100 implements a complete end-to-end QoS solution. Network signalling is not affected, and component failure in bandwidth manager 100 does not result in a loss of service. So the implementations are stable. Easy scaling is provided by distributed admission controls. The bandwidth manager 100 is application aware, e.g., voice and VoD can take appropriate action to ensure end-user quality of experience. Virtual topologies and policy control account for operators' business needs and therefore provide flexibility. Changes in the network are accommodated automatically by the architecture.

The S/CAC 104 analyzes all the reservation demands and admits reservations based on the available bandwidth in the core network, e.g., 102 in FIG. 1. It distributes an allocation matrix to all the involved media gateways (MGWs). The information describes how much bandwidth is reserved for a particular media gateway to communicate with other media gateway's. Each media gateway manages its allocated bandwidth internally, and will not allow sessions beyond the reservation. An example call connection is described in Table-IV. For every active bandwidth reservation, the S/CAC 104 maintains information for a Unique Identifier provided by the media gateway at the time of setup, a Source media gateway (MG), a Source provider edge (PE), a Destination media gateway, a Destination PE, an Owner media gateway, a Bandwidth requirement, a Session Type: Application type, and an Expiry Time: Time/Date at which a session will be deallocated.

TABLE IV example
When subscriber "A" tries to communicate with subscriber "B":

1. A will communicate with media gateway [A];
2. media gateway [A] will resolve the location of "B" and will validate the bandwidth availability between media gateway[A] and media gateway[B] based on local data;
3. media gateway[A] will signal media gateway[B] to initiate communication with "B";
4. media gateway[B] will validate the bandwidth availability between media gateway[B] and media gateway[A] based on local data;
5. Subscriber "B" is alerted to the incoming communication;
6. Communication is up between "A" and "B".

Bandwidth reservation admission comprises a data path search, and a bandwidth availability check. This differs from ATM/TDM admission control systems where the end-to-end connection also needs to be set up. In a network, the data path has already been determined based on the routing protocol, regardless of the utilization of the network. S/CAC 104 relies on the L3 topology and routing function 112 to search for and calculate the shortest path between two PEP's within the managed network. The data path search result is returned in the form of ordered list (in Path Table 124) of all the involved network segments, e.g., as identified by links/nodes.

For data path management, the core network routers can be divided into provider edge (PE) and provider (P) based on the functionality. Media gateways are connected on the edge of the network to the PE. If all media gateway's had to be connected to all other media gateway's, then a large number, n(n−1), of reservations would be generated (where, "n" is the number of provider edge routers).

But all the possible paths in the network do not need to be monitored, so the S/CAC 104 registers for notifications on specific network paths, as identified by source and destination PE's. As a result, any changes or reroutes are included in the notifications that will be issued. In the case of a network event that triggers change to a registered path, update path or "path unavailable" indicators are communicated if the network event resulted in a disconnection in the route.

Bandwidth reservation requests can be submitted as individual requests or as a bulk request (Demand Matrix). A reservation request includes all the information needed to setup a session between two different media gateway's. The request initiator can be a higher system (OSSI API), System administrator (GUI, scripts), or the media gateway itself. Individual bandwidth reservation requests include a Unique Identifier provided by the media gateway at the time of setup, a Source media gateway, a Source PE, a Destination media gateway, a Destination PE, an Owner media gateway, a Bandwidth requirement, a Reservation Length, and an Application Type. Each reservation request return includes a Return code to indicate success or failure, a Reason code to further identify the reason of failure, an Offered bandwidth in case of not being able to satisfy the original request, and a Session description: Reservation Descriptor.

Initially in the network, an adaptive reservation admission algorithm would allow the engineered reservation numbers to converge to real numbers, and after a while an operator could switch a strict reservation admission. Media gateways would not be involved with strict reservation admission, as the admission decision will be based on the S/CAC 104 view of the utilization which is identical to the reservation view. Each media gateway should be able to be interrogated for actual utilization numbers to adjust the reservation numbers when using adaptive reservation admission. The S/CAC 104 can offer a combination of the two algorithms by adding strict flag to the reservation descriptor, and apply adaptive reservation admission. When the strict flag is enabled, the actual utilization can be assumed to be equal the reservation.

A network's core and edges typically comprise preexisting installations and interconnections, and to this are added various control mechanism embodiments of the present invention. The mechanisms added to manage the network must not affect the inherent stability of the network. The mechanisms must be able to scale up in size with the applications and the network, and not be cost-prohibitive to do so. Each application whose resources are being denied or throttled must be made aware that its needs are being affected so it can choose some alternative, e.g., standard video in lieu of high definition. Service operators' business needs and policies must be strictly accommodated. Such mechanisms must be able to bridge the entire network life cycle so QoS can be ensured across the whole operational life-time.

Figure 2A:
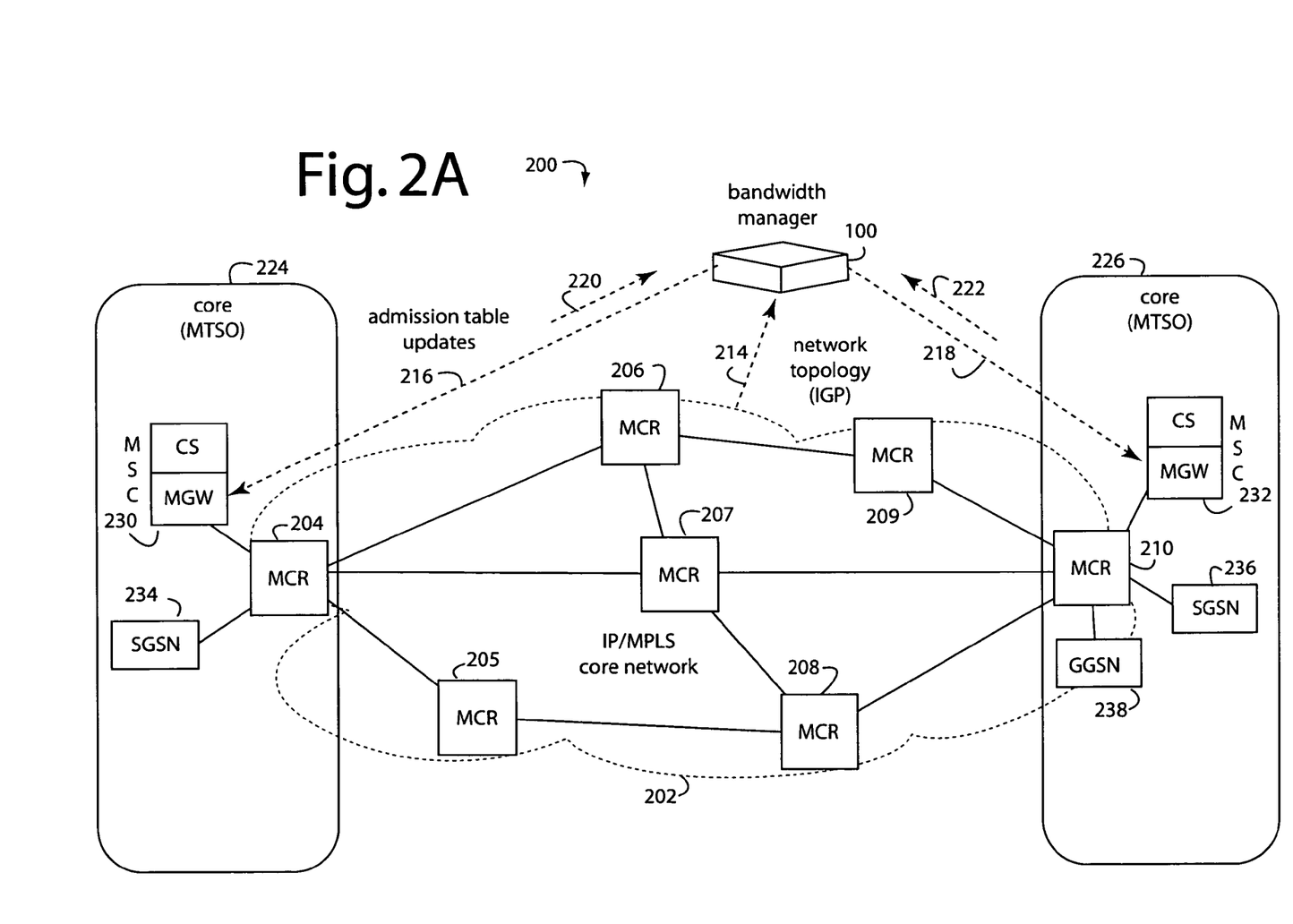
FIG. 2A is a functional block diagram of an packet-switched network embodiment of the present invention for voice in the mobile core.
Figure 2B:
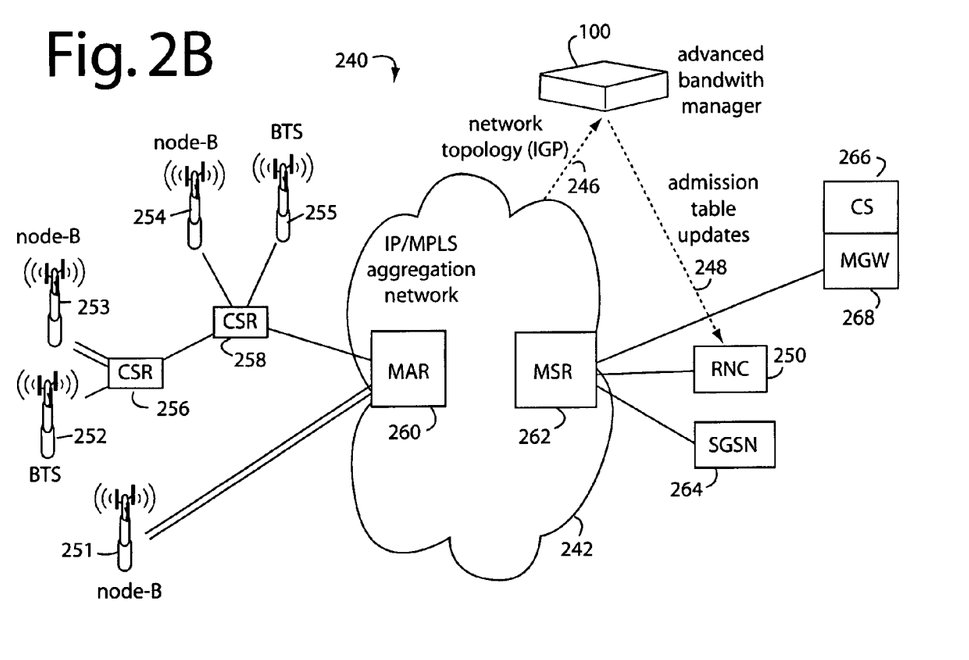
FIG. 2B is a functional block diagram of an packet-switched network embodiment of the present invention for voice in the mobile radio access network.
Figure 2C:
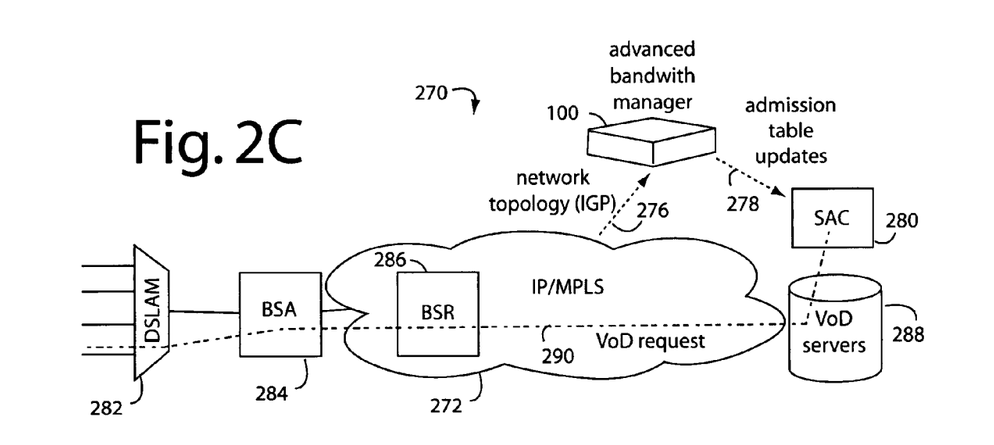
FIG. 2C is a functional block diagram of an packet-switched network embodiment of the present invention for video on demand in triple play networks.

FIGS. 2A-2C represent the three kinds of networks and traffic that require admission controls to guarantee QoS when network capacity is being reached or exceeded. Not all three classes of traffic would present at a single PEP 102 (FIG. 1), for example. But, a single ABM 100 could be employed to control all types of traffic classes as they traverse a common core network. Specialized PEP's 102 on the edges of their corresponding networks are illustrated in each of FIGS. 2A-2C, e.g., for voice in FIGS. 2A-2B, and for video in FIG. 2C.

FIG. 2A represents a network embodiment of the present invention for voice traffic classes in the Mobile Core, and is referred to herein by the general reference numeral 200. In this application, voice traffic is packetized or simply passed through packet-aware proxies from the edge of a core network 202.

Previously, in TDM networks with session/call admission control (S/CAC), admission controls could be computed in each media gateway from the size of the egress paths to corresponding particular destinations because the circuits were dedicated. The admission control could then be implemented with admission table entries that dictated the bandwidth that could be used for each network destination. In core network 202, the routing topology and supportable bandwidths on the available paths are constantly changing. Individual media gateways do not have the necessary visibility into the network to monitor the routing topology changes, nor can they coordinate the bandwidth loads that other media gateways would place on shared resources.

In some embodiments of the present invention, the network is IP or IP/MPLS, and the bandwidth reservations to be used for admission control are provided to the media gateways from a central point.

Network 200 supports end-to-end quality-of-service (QoS) for voice traffic in mobile core applications. Core network 202 comprises many interconnected core routers, as are represented here by mobile core routers (MCR's) 204-210.

An advanced bandwidth manager (ABM) 100 is attached to the core network 202 such that it can receive network topology reports 214 from listeners, e.g., using an interior gateway protocol (IGP). Point-to-point abstractions from the IGP reports 214 are built and organized into path tables. Admission controls for the network as a whole can then be based on these abstractions. Call destinations are abstracted into point-to-point availability lists.

Admission table updates 216 and 218 are pushed to the network edges to inform the local policy enforcement points (MSC's 204, 210) how they should manage their respective bandwidth loads according to application types. If an edge point needs more bandwidth, e.g., to initiate a new call or connection, resource requests 220 and 222 can be forwarded to the ABM 100. Additional resources can be drawn from a resource pool, or borrowed from other provider edges. Such can make more bandwidth available, and updated admission table updates 216 and 218 are pushed to the affected provider edges.

In FIG. 2A, mobile telephone switching offices (MTSO's) 224 and 226 represent two edge points in one kind of application service, e.g., mobile core networks. In this application, policy enforcement points (PEP's) are embodied in mobile switching centers (MSC's) 230 and 232, and these include a call server (CS) and a media gateway (MGW). MTSO's 224 and 226 include server general packet radio service (GPRS) support nodes (SGSN's) 234 and 236, and a typical gateway GPRS support node (GGSN) 238.

In operation, when a call or connection request comes into MSC 230, the admission control table in MSC 230 is consulted with regard to the call destination point availability, e.g., MSC 232 on the other side of core network 202. Call bandwidth is accommodated and added to the total of the already existing connection loads. The call request is then admitted and routed through the network.

During periods of high user demand, the same call request is received by MSC 230, but the already existing connection loads will be consuming all the reserved bandwidth. So, a more-resources-needed request 220 is sent through MCR 204 to ABM 100 that specifics the point-to-point connection needed, e.g., SFO-NYC (San Francisco to New York City). The ABM 100 searches through its information and routing abstractions to see if the request can be granted. If so, it updates its own view of the network bandwidth loading, and pushes down new admission tables to the affected policy enforcement points, e.g., MSC 230 and 232. The call request can then be routed through to the destination, e.g., MSC 232.

If a network failure were to occur, e.g., between MCR 204 and MCR 207, an IGP network topology report 214 would document such failure to the ABM 100 in real-time. Such would cause a recalculation of all the point-to-point abstractions that depended on the link between PE 204 and MCR 207. In the meantime, the core network 202 would converge as all MCR's 204-210 become aware of the failure and make their own adjustments.

If calculated as being necessary, appropriate admission control table updates 216 and 218 are independently issued by ABM 100 to all affected policy enforcement points. In FIG. 2A that would be MSC 230 and 232.

So, the ABM 100 uses the new topology that exists after the failure to determine if the network can sustain existing reservations. If yes, then no action is needed. If no, then the new reservations calculated are pushed to the relevant policy enforcement points. If availability exceeds demand, then calls stay up. Otherwise, the MGW's, as PEP's, shed whole calls to get back down inline with their local priority algorithm limits. The nature of the application does not permit all calls to be degraded, because no call quality would then be adequate for the service being purchased.

FIG. 2B represents a network embodiment of the present invention for voice in the Mobile Radio Access Network (RAN), and is referred to herein by the general reference numeral 240. An aggregation network 242 has an ABM 100 to monitor network routing topology IGP reports 246 and to compute from them various bandwidth reservations that are pushed down in admission table updates 248. In this application, packetized voice traffic is admitted to the RAN by a Radio Network Controller (RNC) 250. S/CAC is needed in RAN applications because large numbers of low-bandwidth "last-mile" circuits are employed.

In the TDM networks that were previously used in the Industry, the RNC's S/CAC function could be based on the number of TDM circuits existing between a particular cell site, e.g., 251-215, and RNC 250. But, aggregation network 242 does not reasonably allow the destination bandwidth to be obtained from the size or number of circuits, because using point-to-point dedicated circuits between the RNC and BTS limits the efficiency increase provided by an access network. The ABM 100 must provide admission table updates 248 computed from the routing topology information it splices together by monitoring IGP reports 246.

In operation, the voice traffic from cellular telephone node-B and base transceiver stations (BTS's) 251-215 are switched by cell site routers (CSR's) 256 and 258. A mobile aggregation router (MAR) 260 and mobile service router (MSR) 262 transport calls across network 242 first to an RNC 250 which separates the voice and data traffic, and then to an SGSN 264, CS 266, and media gateway (MGW) 268.

The ABM 100 informs the RNC 250 of the resources the RNC can use to each destination. The RNC 250 computes its current utilizations against the capacities it has available. A multi-stage approach can be employed to make more efficient use of the network 242 resources between a hub aggregation site and the RNC. In a single-stage example, an admission table on an RNC 250 located in San Francisco might look like,

| DESTINATION | CURRENT UTILIZATION | AVAILABLE CAPACITY |
| --- | --- | --- |
| SFO.1002 | 1,200 Kbps | 3,000 Kbps |
| SFO.1003 | 1,856 Kbps | 4,500 Kbps |
| SFO.1004 | 222 Kbps | 1,000 Kbps |

The resources between hub sites and the switching office can be shared by many base stations, so admitting traffic against the shared resources in a second stage can result in a more efficient use of the available bandwidth.

A multi-stage admission table in this same example would be like,

|  |  | STAGE 1 (TO HUB) | | STAGE 2B (TO SITE) | |
| --- | --- | --- | --- | --- | --- |
| DESTINATION | HUB SITE | CURRENT UTILIZATION | CAPACITY AVAILABLE | CURRENT UTILIZATION | CAPACITY AVAILABLE |
| SFO.1002 | SFO.HUB.001 | 3,056 Kbps | 10,000 Kbps | 1,200 Kbps | 3,072 Kbps |
| SFO.1003 |  |  |  | 1,856 Kbps | 4,608 Kbps |
| SFO.1004 | SFO.HUB.004 | 222 Kbps | 1,000 Kbps | 222 Kbps | 1,536 Kbps |

A capacity available limit is provided by the ABM 100, based on its global view of all the network demands. In this example, checks in two stages would be made for each call by the RNC 250 during call set up. In the first check, the call would be checked against the available bandwidth to the hub site. Such hub site may be connected over an Ethernet circuit running IP. In the second check, the system checks the capacity available in the last mile from the hub to the cell site.

FIG. 2C represents a network embodiment of the present invention for video on demand (VoD) in triple play networks, and is referred to herein by the general reference numeral 270. A triple play network 272 is controlled by an ABM 100 that receives network routing topology IGP reports 276. These are coordinated and bandwidth reservations are computed and pushed down in admission table updates 278, e.g., to a session admission control (SAC) 280 of a subscriber services controller (SSC). VoD requests come in from a digital subscriber line access multiplexer (DSLAM) 282 through a broadband service aggregator (BSA) 284 and to a broadband service router (BSR) 286 in the network 272. The requests make it through to VoD servers 288 and to the SAC 280.

An aggregation infrastructure for a service delivery architecture can be based, e.g., on Alcatel-Lucent 7450 ESS type BSA's, and Alcatel-Lucent 7750 SR type BSR's to form a distributed "virtual node". The BSA's do the subscriber-specific functions where the various functions scale, and the BSR's provide the routing intelligence where it is most cost-effective. Network and service scaling are achieved by dividing the Layer-2 and Layer-3 functions between the BSA and BSR and by distributing key service delivery functions. BSA's are more distributed than BSR's, cost-effectively scaling per-subscriber policy enforcement since the required functionality is distributed to lower-cost Layer-2 aggregation interfaces instead of costly router or BRAS interfaces. The BSA incorporates Internet group management protocol (IGMP) proxy multicasting and wire speed security, per-subscriber service queuing, scheduling, accounting, and filtering. The BSA is a high capacity Ethernet-centric aggregation device that supports hundreds of Gigabit Ethernet (GE) ports, tens of thousands of filter policies, and tens of thousands of queues.

BSA's forward traffic using Layer-2 mechanisms, and have the quality of service (QoS) and filtering intelligence to enforce higher-layer policies. Distribution of the QoS functionality on the BSA means that per-subscriber QoS is enforced accurately since it occurs after the last major downstream congestion point, the aggregation network. BSA's aggregate traffic for all services towards the BSR, which is an IP edge device optimized for DHCP-based video service delivery. It terminates the Layer-2 access and routes using IP over multiprotocol label switching (MPLS), with support for a full set of MPLS and IP routing protocols, including multicast routing (protocol independent multicast, sparse mode (PIM-SM/IGMP). A BSR can support hundreds of GE and synchronous optical network (SONET) uplink ports (for large-scale deployments) and sophisticated QoS for per service and per-content/source differentiation.

BSR 286 provides service distribution routing based on guarantees required to deliver the service and associated content, rather than on individual subscribers. The BSR classifies content based on the required forwarding class for a given BSA 284, to ensure that each service's traffic receives the appropriate treatment towards the BSA.

In the BSR-to-BSA direction in which the video is flowing, IP services rely on IP layer classification of traffic from the network to queue traffic appropriately towards the BSA. Under extreme loading, which would be expected to occur during network fault conditions, lower priority data services or HSI traffic can be rolled back to protect video and voice traffic. Classification of HSI traffic based on source network address or IEEE 802.1p marking allows the QoS information to be propagated to upstream or downstream nodes by network elements.

In the BSA-to-BSR upstream direction, traffic levels are substantially lower. Class-based queuing is used on the BSA network interface to ensure that video control traffic is propagated with a minimal and consistent delay, and that preferred data and HSI services receive better treatment for upstream/peering service traffic than the best effort Internet class of service Networks, such as network 272, that are built to support triple play tend to be very high capacity, and such high capacity will usually minimize the need for S/CAC on the voice application traffic. Voice is low bandwidth but high priority.

VoD, and especially high-definition VoD, consume very large amounts of bandwidth. The VoD traffic class can therefore congest and is a prime application for S/CAC. S/CAC for VoD is most efficient when using multi-stage admission techniques. The natural policy enforcement points for triple play networks are the same points used for subscriber policy control.

In FIG. 2C, admission is performed by the session admission control (SAC) 280 of the subscriber services controller (SSC). The SSC verifies for the VoD system that the subscriber is allowed to request the session. The SAC 280 checks the available network reservations to see that there is enough bandwidth available for the session. The SAC 280 gets its information on what the edge links look like from its understanding of the network topology.

The ABM 100 provides the SAC 280 with any missing links to cover the resources in the routed portion of the network. The routed portion of the network can begin at either the BSA 284 or the BSR 286, depending on the network. A sample admission table might look like,

|  |  | STAGE 1 (TO BSA) | | STAGE 2 (TO DSLAM) | |
| --- | --- | --- | --- | --- | --- |
| DESTINATION | BSR SITE | CURRENT UTILIZATION | CAPACITY AVAILABLE | CURRENT UTILIZATION | CAPACITY AVAILABLE |
| DSLAM.SFO.1002 | SFO.BSR.001 | 2,233,110 Kbps | 8,500,000 Kbps | 1,300,500 Kbps | 2,000,000 Kbps |
| DSLAM.SFO.1003 |  |  |  | 932,610 Kbps | 1,000,000 Kbps |
| PON.SFO.1004 | SFO.BSR.004 | 5,439,000 Kbps | 8,500,000 Kbps | 5,439,000 Kbps | 8,500,000 Kbps |

The capacity available limits are provided by the ABM 100 according to its global view of the network demands. VoD is an ideal application for virtual topologies. In a triple-play network, voice is usually marked above video, and video above data. Such ensures that voice will get through, regardless of the video traffic. However, VoD can consume so many resources it is possible that the VoD could entirely starve the data class. This would result in customers' data connections becoming almost useless.

Such cannot be prevented with network based class-of-service markings. Assigning a virtual topology with resources less than the physical link bandwidth will guarantee that a certain minimum bandwidth will be preserved for data traffic. ABM 100 provides such critical capability in a simple, scalable way.

Figure 3:
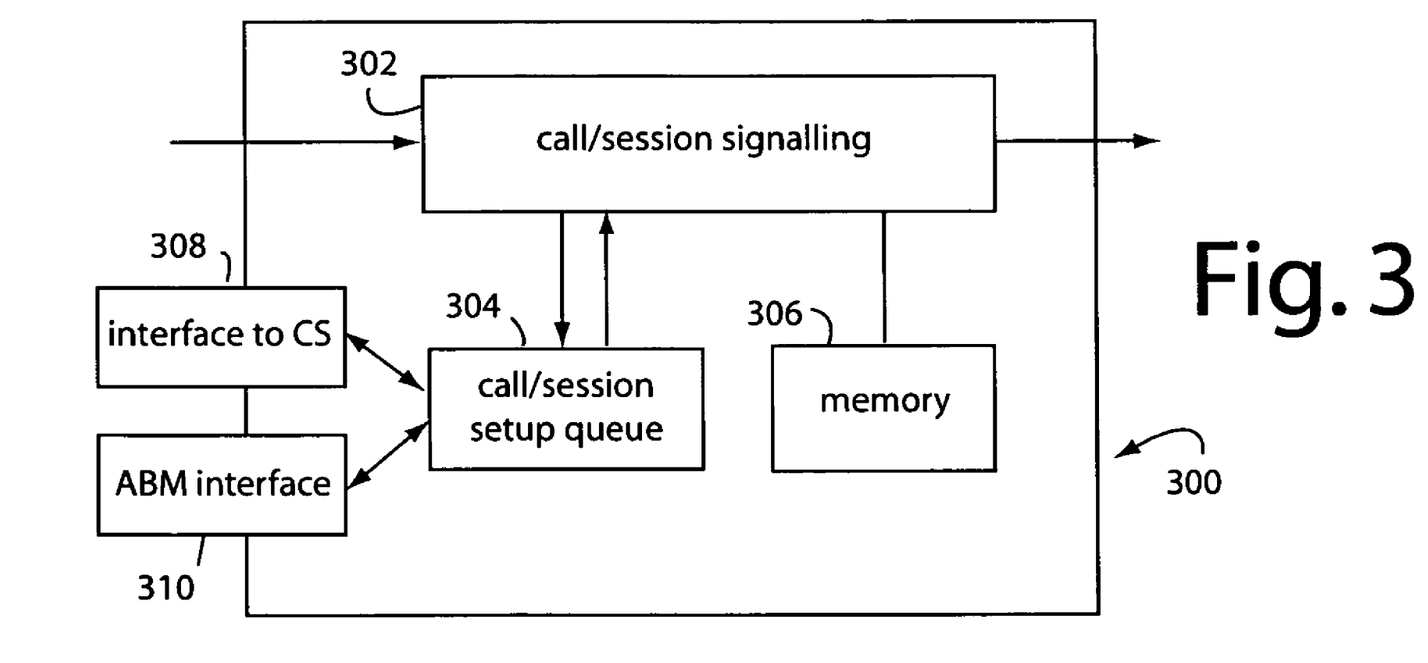
FIG. 3 is a functional block diagram of a policy enforcement point embodiment of the present invention, as related to FIGS. 1 and 2.

FIG. 3 represents the call/session signaling hardware included in PEP 102, and is referred to herein by the general reference numeral 300. PEP signaling hardware 300 includes a call/session signaling module 302, a call/session signaling setup queue 304, a memory 306, a call switch (CS) interface 308, and an ABM interface 310.

PEP 102 and S/CAC 104 reservations/negotiation traffic 105 (FIG. 1) through ABM interface 310 can be implemented with a number of well-known and reliable protocols. For example, a web services protocol, the IETF Industry specified DIAMETER protocol, or other system could be used. Embodiments of the present invention are protocol-mechanism independent, but will most likely use DIAMETER. It is important that the messages be authenticated to ensure that legitimates PEP's 102 are talking to legitimate S/CAC's 104, and vice versa. Such can be done with conventional authentication mechanisms, e.g., hashed message authentication codes (HMACs). The data may be encrypted between the PEP 102 and S/CAC 104 if there is a concern about information intercept.

The messages from S/CAC 104 to PEP 102 may include full or partial admission tables. Each table includes encoded rows for the source, destination, available bandwidth, class-of-service, etc. Such information can be unidirectional or bidirectional, depending on the application.

Table information is used by PEP 102 as the basis for its admission table. PEP 102 adds the current utilization to that destination to the table to form the local admission table. Messages from PEP 102 to S/CAC 104 include requests for information. On boot up, PEP 102 sends a request for the entire table to S/CAC 104. It may also send such request at a later point as well. When the actual or expected utilization to a particular destination will be higher than the reserved bandwidth, PEP 102 sends a request for the desired additional bandwidth.

The S/CAC 104 analyzes the requests, and returns messages increasing the bandwidth to that destination, or it would return a message denying the request and indicating the amount of bandwidth that is available. If the PEP 102 accepts the bandwidth the S/CAC 104 indicated is available, it then sends an additional request specifying that amount.

Figure 4:
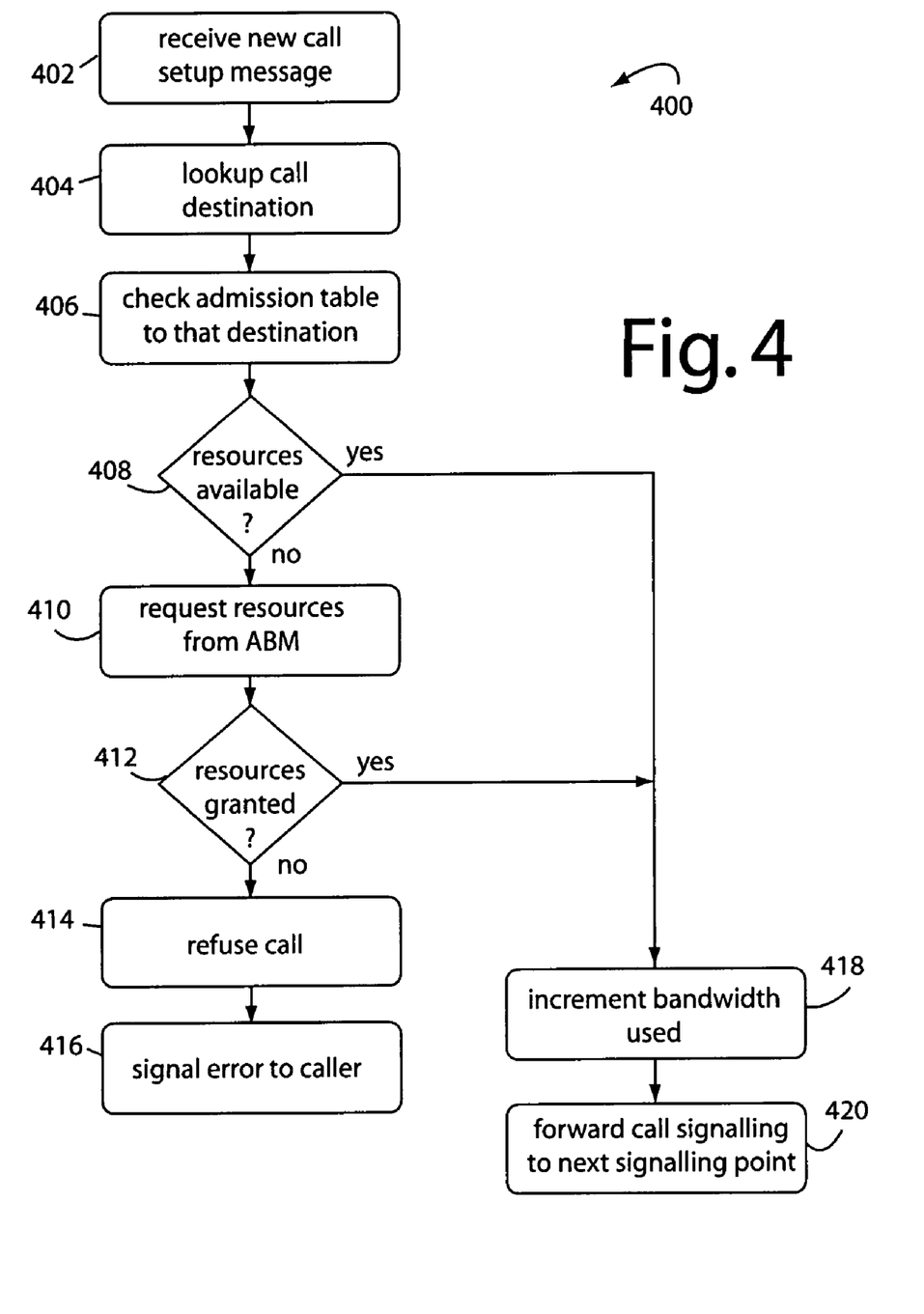
FIG. 4 is a flowchart diagram of PEP call setup embodiment of the present invention that provides bandwidth to new traffic being presented at a policy enforcement point, as in FIG. 1.

FIG. 4 represents a call setup method embodiment of the present invention, and is referred to herein by the general reference numeral 400. A new call setup message is received in a step 402. A step 404 looks up the call destination. The admission table entry for that destination is consulted in a step 406. A step 408 sees if the bandwidth is already reserved and available locally. If not, the ABM (really the S/CAC 104) needs to be consulted in a step 410. A step 412 looks to see if the requested resources were granted. If not, a step 414 has to refuse the call, and a step 416 sends an error signal to the caller. But if resources were locally available at the PEP 102, or they were granted by the ABM, then a step 418 increments the bandwidth being used, and a step 420 forwards call signaling to the next point.

Figure 5:
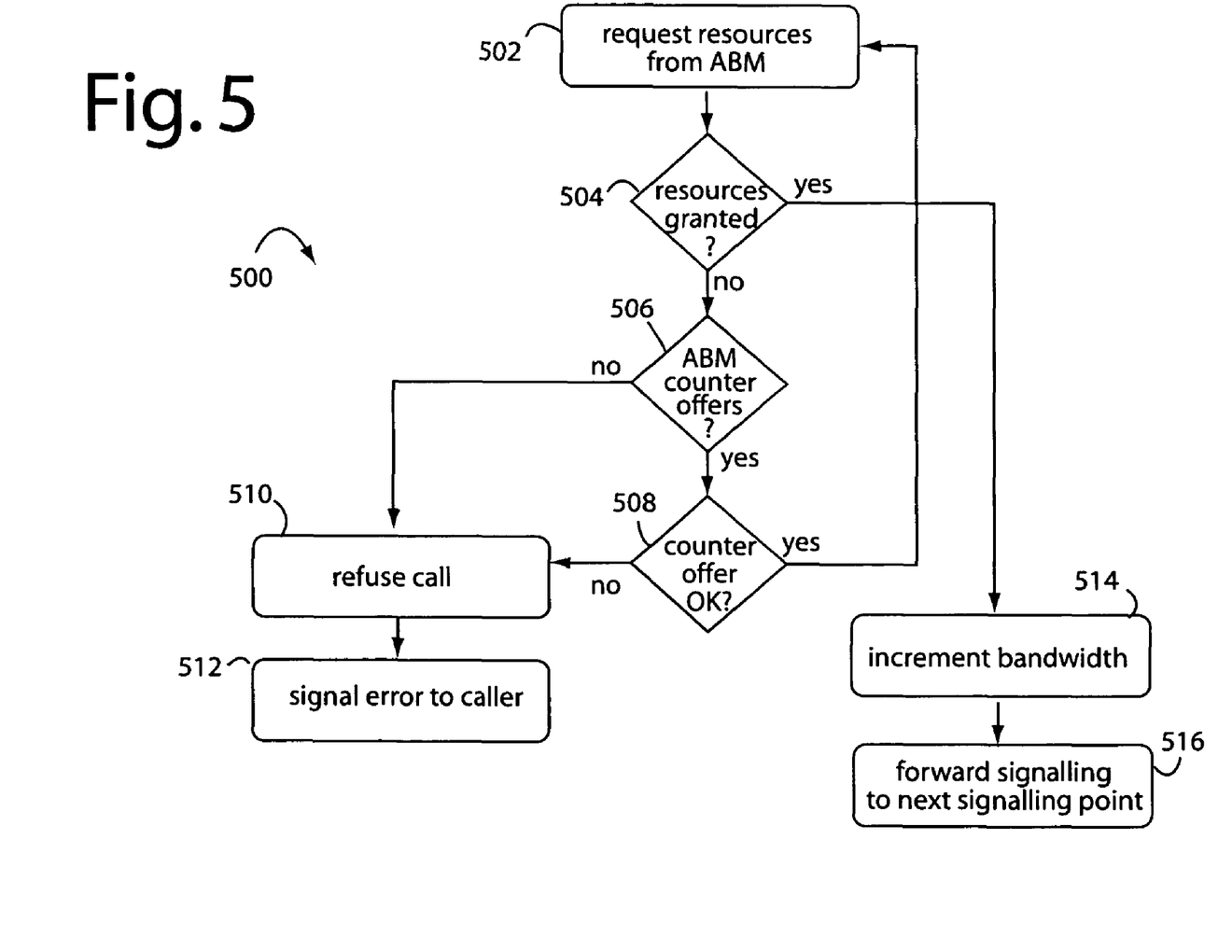
FIG. 5 is a flow chart diagram of policy enforcement point and session/call admission controller negotiation process embodiment of the present invention that bargains for increases in bandwidth reservations as new calls are presented at the PEP that would overstep its existing capacities.

The bandwidth negotiation is diagrammed in FIG. 5 as a negotiation method 500. Requests for ABM resources are issued in a step 502. A step 504 sees if the requests can be granted. If not, a step 506 sees if there is a counter offer from the ABM. If yes, a step checks the acceptability of the counter offer. If not acceptable, then a step 510 refuses the call, and a step 512 signals the error to the caller. Otherwise, if the resources are granted, then a step 514 increments the bandwidth and a step 516 forwards signaling to the next point.

In a traditional TDM system, when a link is torn down along a path from A-B, the system that originates the calls holds onto the calls, and attempts to readmit them by re-signaling the calls on a hop-by-hop basis through to the other end. Each call is re-signaled. Assuming an alternate path is available, calls are held in a queue. While the calls are in a queue, communication between the endpoints is severed. Users may drop off if the disruption is long enough. Eventually, the re-signaling may fail since insufficient resources may be available along an alternate path.

In S/CAC 104, failures that do not affect the session/call load are not re-signaled at all. If, after recalculating, there is no need to update a given PEP 102 reservation table. All calls stay up, there is no impact, the call/session data is rerouted by the underlying data network, and is largely invisible to the user of the application. If a failure is severe enough that it would impact the session/call load on a PEP 102, then the work around to the failure is communicated to the PEP 102 with a reservation update. The PEP 102 then locally drops calls if necessary to stay within the new reservation limit.

Which local drop algorithm to use is a local decision, but emergency calls should stay up. Other calls can be dropped using whatever priority mechanism is desired by the operator, e.g., longest call, shortest call, random call. There is no need to hold and re-signal calls. Calls that do not get dropped maintain their up status and communication bridges over the failure event. Session/call data is rerouted by the underlying network and is largely invisible to the user of the application.

Because circuits are available in rough sizes and capacity should lead utilization, there is often extra unused marginal bandwidth in a network. Such excess bandwidth can be proportionally over-allocated to each PEP 102 based on estimated demand growth. While simple, an occasional re-allocation is needed since demand estimates are not perfect. Or, the excess can be held in reserve by the S/CAC 104, and allocated to PEP's 102 in future requests. Such is a little more complicated to implement, but the reservations are only allocates when there is a need, and can better keep up with real demand growth.

An ABM method embodiment of the present invention requires the S/CAC 104 to shed particular sessions/calls that are calculated to maintain service for existing application traffic, and that maximizes at least one of total revenues being earned, total number of calls remaining, and customer goodwill.

In general, embodiments of the present invention can include and benefit IP, MPLS, and IP/MPLS networks.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A policy enforcement point (PEP), comprising:
a processor for attachment to an edge of a packet-switched network providing for autonomous short-term, application-aware controls applied to autonomously control admission of corresponding network ingress traffic to said packet-switched network, and further providing for long-term traffic controls on said corresponding network ingress traffic; and
a memory storing a plurality of admission control tables downloadable from a session/call admission controller (S/CAC) independently located within the topology of said packet-switched network, wherein the admission control tables are used by the PEP to implement said long-term traffic admission controls that differentiate between traffic classes and the admission control tables are automatically updated by the S/CAC and downloaded from the S/CAC in response to a change in packet-switched network topology or bandwidth reservation capacity due to a network failure;
wherein, the admission control tables are disposed in the memory of the PEP to locally dictate how much application traffic in each traffic class can be admitted, wherein voice, video, and data application traffic streams are discriminated and prioritized, and is such that when a new call or session is presented to said PEP, the admission control tables are consulted to determine if enough bandwidth in that class is reserved for said new call and whether said new call can be admitted, and if not then consulting said S/CAC to obtain increased bandwidth reservations.

2. The PEP of claim 1, further comprising:
a processor centrally located in the S/CAC for calculating if a particular PEP may admit more, or must shed, sessions/calls to maintain service for other existing application traffic.

3. The PEP of claim 2, wherein:
the processor centrally located in the S/CAC operates to shed particular sessions/calls that are calculated to enable service to be maintained for existing application traffic, and that the particular sessions/calls being shed maximizes at least one of a total of revenues then being earned, a total number of calls remaining after shedding, and an estimate of customer goodwill.

4. The PEP of claim 1, further comprising:
a mechanism included in said S/CAC for automatic downloading of updated admission tables to a corresponding PEP when it in particular is affected by a change in packet-switched network topology or bandwidth reservation capacity.

5. The PEP of claim 1, further comprising:
a negotiation process mechanism included with said S/CAC and PEP to enable the PEP to request additional network resources, and for said S/CAC to communicate to the PEP whether such a request has been granted, and for the PEP to thereafter make local decisions to admit calls requiring said additional network resources.

6. The PEP of claim 5, further comprising:
a bargaining process mechanism included with the S/CAC and the PEP to enable to request additional network resources, and for said S/CAC to communicate to the PEP that such a request can only be partially granted, and for the PEP to accept a partial grant and thereafter make local decisions to admit calls that require only a part of said additional network resources.

7. A method for admission control at a network edge, comprising:
providing, by a processor of at least one policy enforcement point (PEP) attached to an edge of a packet switched network, autonomous short-term, application-aware controls to autonomously control admission of corresponding network ingress of voice, video, and data application traffic to said packet-switched network, and further providing long-term controls on corresponding network ingress traffic; and
managing network ingress traffic to said packet-switched network when such nears or exceeds said packet-switched network capacity, and that is enabled to do so by computations of current network routing topology and bandwidth reservations;
using an internal admission control table stored in a memory of each PEP to determine how much application traffic in each traffic class can be admitted, wherein voice, video, and data application traffic streams can be treated differently and prioritized, and such that when a new call or session is presented to said PEP, its admission control table is consulted to determine if enough bandwidth in that class is reserved for it and the call can be admitted, and if not then consulting a session/call admission controller (S/CAC) to obtain increased bandwidth reservations;
wherein the admission control table in each PEP is automatically updated by the S/CAC and downloaded from the S/CAC in response to a change in packet-switched network topology or bandwidth reservation capacity due to a network failure; and
wherein, each of the PEP and S/CAC is independently located within the topology of said packet-switched network, and each uses said packet-switched network to communicate with one another, and together implement admission controls that differentiate between traffic classes.

8. The method of claim 7, further comprising:
using a number of path tables in said S/CAC to calculate if a PEP may admit more, or must shed, sessions/calls to maintain service for other existing application traffic.

9. The method of claim 8, further comprising:
shedding particular sessions/calls that are calculated to enable the network to maintain service for existing application traffic, and that maximizes at least one of a total of revenues being earned, a total of the number of calls thereafter remaining, and an estimate of customer goodwill.

* * * * *